Nov. 11, 1952 — J. R. CLAYTON — 2,617,341
EARTHWORKING IMPLEMENT
Filed Jan. 30, 1948 — 2 SHEETS—SHEET 1

INVENTOR.
John R. Clayton
BY Barnes, Kisselle, Laughlin & Raisch
ATTORNEYS.

Nov. 11, 1952     J. R. CLAYTON     2,617,341
EARTHWORKING IMPLEMENT
Filed Jan. 30, 1948     2 SHEETS—SHEET 2

INVENTOR.
John R. Clayton
BY
*Barnes, Kisselle, Laughlin & Raisch*
ATTORNEYS.

Patented Nov. 11, 1952

2,617,341

UNITED STATES PATENT OFFICE 2,617,341

EARTHWORKING IMPLEMENT

John R. Clayton, Detroit, Mich.; Nina L. Clayton, executrix of said John R. Clayton, deceased Application January 30, 1948, Serial No. 5,223

1 Claim. (Cl. 97—40)

This invention relates to a farm implement and it has to do particularly with an implement for cultivating the soil by means of rotary elements for cutting and pulverizing the soil.

The principal object of the invention is to provide an improved apparatus for cutting and pulverizing the earth. Briefly, the machine provides improved rotary tilling mechanism which can be controlled by the operator as to the depth of cut and to this end rotary earth cutting and pulverizing elements are provided, the rotation of which is reverse to that of the propelling wheels of the machine.

Figure 4:
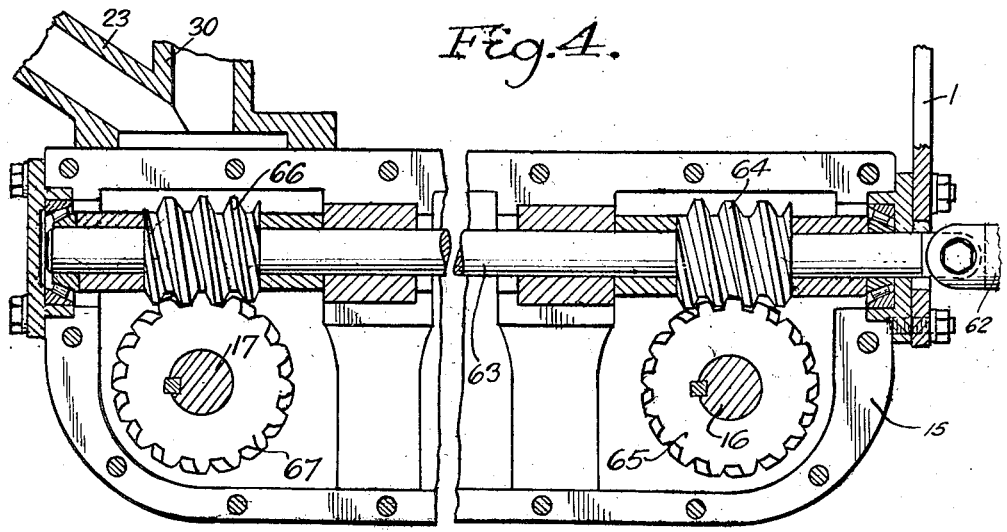
Fig. 4 is a sectional view showing driving mechanism for the rotary cultivating elements.
Figure 2:
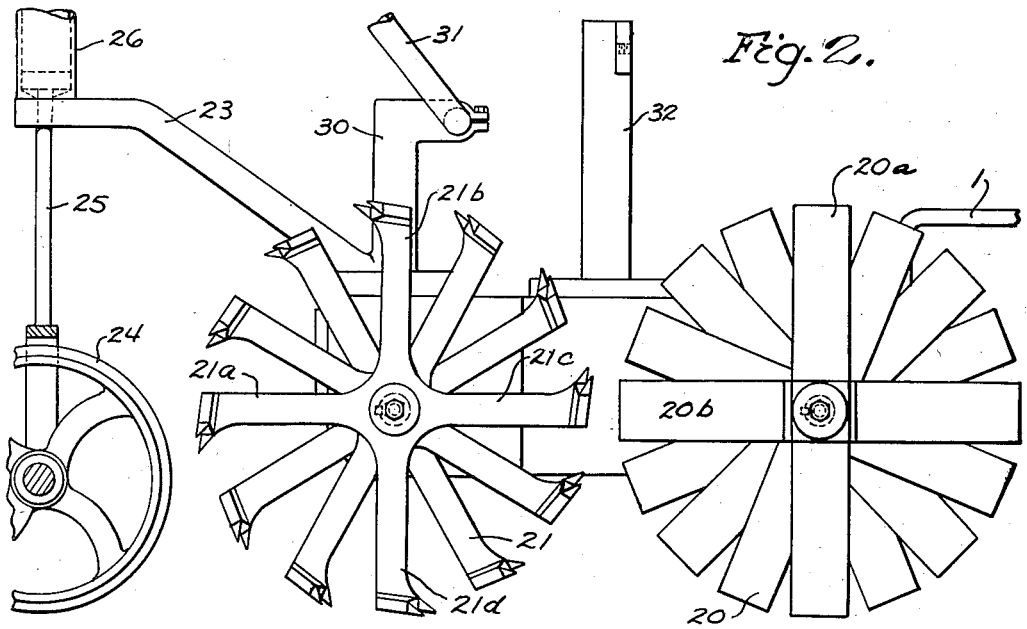
Fig. 2 is a side elevational view with a cover removed showing the rotary cultivating elements.

The machine comprises a suitable frame 1 upon which is mounted an engine 2, preferably an internal combustion engine, having an air cleaner 3 for the entrance of air and having a driving shaft 4 preferably enclosed as shown at 5. The traction wheels 8 are at the forward end of the frame structure and are driven by the engine by means not shown. To the rear of the frame (Fig. 4) is attached a housing 15 having a shaft 16 and a shaft 17 journalled therein. These shafts project to both sides of the housing and the shaft 16 receives the earth cutting blades generally indicated at 20 and the shaft 17 receives the earth pulverizing blades generally illustrated at 21. The housing 15 is of reduced width in its intermediate portion as shown at 22 in order to accommodate the heads of the pulverizing blades 21. A frame member 23 extends rearwardly from the housing 15 to which it is attached and it carries vertically adjustable wheel 24 which may be mounted on a rod 25. The wheel 24 may be raised and lowered by means of hydraulic jack 26, operable by a handle 27. The details of the jack are not shown.

A bracket 30 is secured to the housing 15 and it, in turn, receives a suitable handle 31 by means of which an operator may walk behind the machine and aid in manipulating and controlling the same. There is a bracket 32 also attached to the housing, this bracket being for detachably receiving earth cultivating machines such as toothed cultivators (not shown).

A shaft 62 which is driven by the engine is connected to shaft 63 journalled in and extending substantially through the housing 15. The shaft 63 has a worm 64 thereon which meshes with a worm gear 65 on the shaft 16 and a worm 66 thereon which meshes with a worm gear 67 on shaft 17. Operation of the shaft 63, therefore, rotates the shafts 16 and 17. The worms 64 and 66 have threads such that the shafts 16 and 17, and therefore, the rotary tillers 20 and 21 are operated in a direction reverse to the operation of the traction wheels 8.

The tractor may be equipped with a blower mechanism which includes a blower fan 81 in housing 80 driven by the engine through a chain 76 operating over sprocket 82. The outlet for the fan is indicated at 90. A hopper 86 for material to be blown may have a feed screw (not shown) driven by gears 83 and 84.

As the machine moves along the ground, an operator walking behind the same may grip the handle 31 which may be equipped with suitable controls such as a lever 100, a lever 101 and a lever 102 by which the engine, steering and clutches may be controlled.

Figure 3:
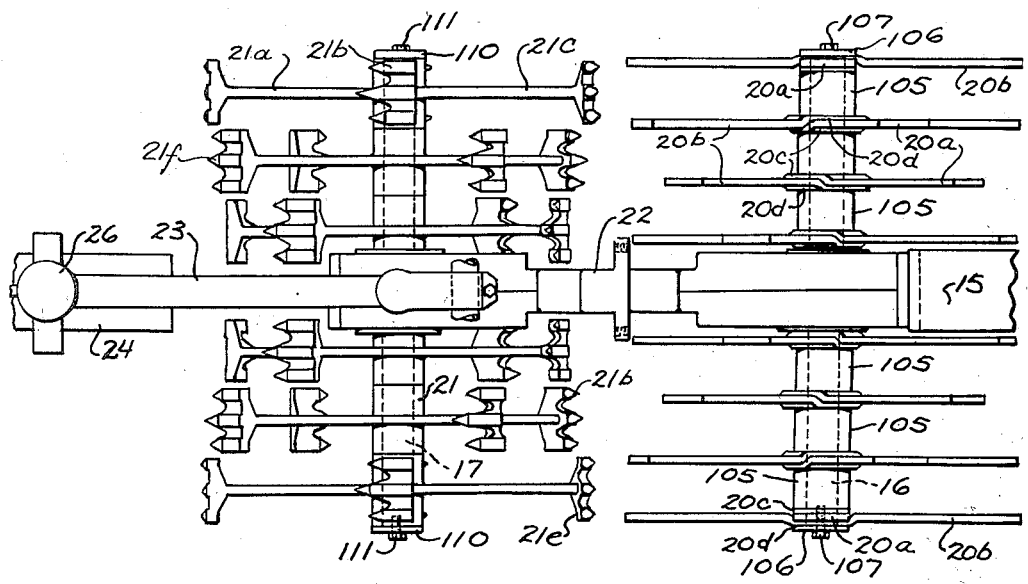
Fig. 3 is a top plan view of the structure shown in Fig. 2.

The ripper blades on the shaft 16 are of simple construction and purposely so designed in order that any given blade may be used at any place for repair or replacement purposes. As shown in Fig. 3, there are four ripper blade sections on each side of the housing 15, and each section comprises two flat blade members crossing each other at right angles and each offset in its center portion so that the blade members interfit. For example, the two outside blade members are shown at 20a and 20b offset respectively at 20c and 20d. The other four sections on each side of the housing are the same with spacer sleeves 105 between each section. The blades are keyed to the shaft 16 and the assembly is held together by a plate or washer 106 and a cap screw 107 which is threaded into the shaft. The structure is the same on both sides of the housing and the same reference characters are applied to like parts.

The pulverizing members on the shaft 17 each comprise a member with four arms 21a, 21b, 21c, 21d, with the members angularly disposed relative to each other in equal increments. These members are keyed to the shaft 17 and held thereon by cap or washers 110 held by a cap screw 111. Each individual member of the pulverizer has a hub portion. These hub portions have some axial extent and are abutted up against each other. Each of the arms of the pulverizing unit have enlarged heads 21e and the heads are so relatively positioned as shown in Fig. 3, that they preferably engage the earth between two rips made by the arms 20. As shown in Fig. 3 each head has three prongs or cutter elements 21f thereon. The term "pulverizing" is used in a descriptive sense and not in a limiting sense. The extent to which the members 21 break or pulverize the soil depends upon the type and condition of the soil and other factors.

A covering 125 is preferably disposed over the rotary tilling elements to prevent throwing the soil.

Figure 1:
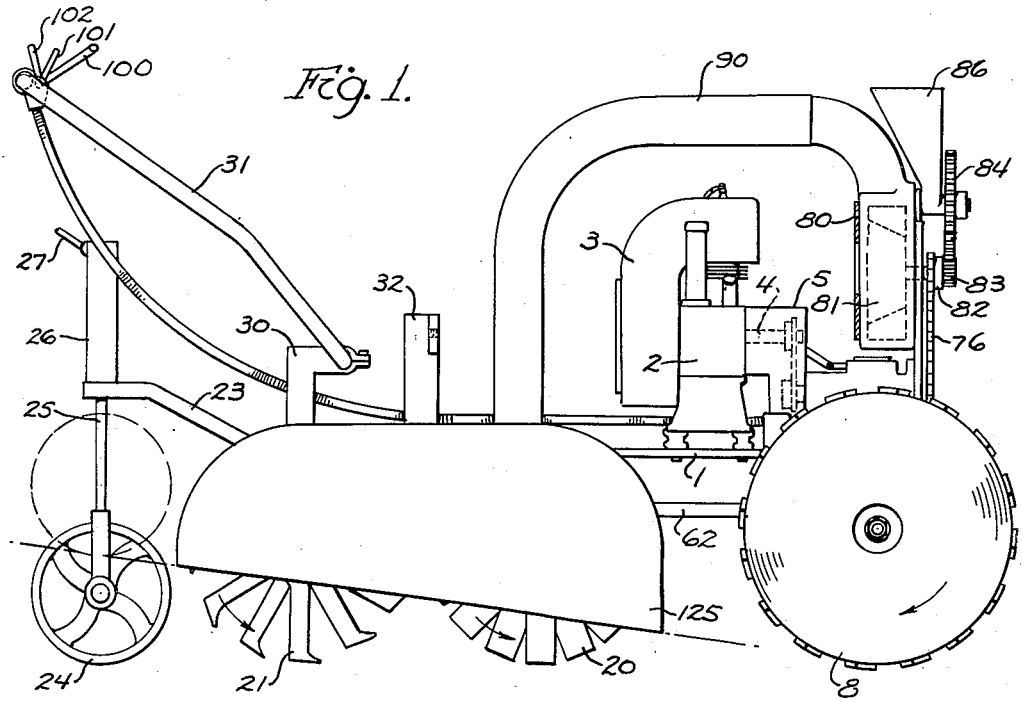
Fig. 1 is a side elevational view of a machine constructed in accordance with the invention.

In use, the machine is set into operation and it will drive itself across a field with the operator walking behind it conveniently with one or both hands on the member 31. In this action, the ripper blades rotate in a direction contrary to the direction of movement of the machine, as shown by the arrow in Fig. 1. These blades penetrate into the ground and rip the same thus preparing the ground to be engaged and pulverized by the reversely operating pulverizing unit 21. The depth of the cut of the ripper blades and the depth of projection of the pulverizing blades into the earth may be regulated by the raising and the lowering of the ground engaging wheel 24 which is done by the jack 26. By lowering the wheel 24 the machine may be propelled without cultivating the earth.

I claim:

In a power operated earth working machine having ground engaging wheels, a pair of power driven shafts disposed transversely to the direction of movement of the machine, one shaft being positioned forward of the other and both being driven with a direction of rotation opposite that of the ground engaging wheels, a plurality of ground ripper blades mounted on the forward shaft and disposed in spaced relationship, the blades being arranged to make narrow rip-like cuts in the earth, a plurality of pulverizing blades mounted on the rear shaft, said pulverizing blades being disposed in spaced relationship and in staggered relationship relative to the ripper blades, each pulverizing blade having a head portion for engaging and working a strip of earth between two rip-like cuts made by the ripper blades.

JOHN R. CLAYTON.

REFERENCES CITED

The following references are of record in the file of this patent:

UNITED STATES PATENTS

| Number | Name | Date |
|---|---|---|
| 471,209 | Cordes | Mar. 22, 1892 |
| 948,820 | Mosher | Feb. 8, 1910 |
| 1,265,491 | Obitts | May 7, 1918 |
| 1,292,391 | Dougherty | Jan. 21, 1919 |
| 1,778,334 | Pedersen | Oct. 14, 1930 |
| 2,015,587 | Bready | Sept. 24, 1935 |
| 2,063,769 | Suelflow et al. | Dec. 8, 1936 |
| 2,144,275 | Scholtz | Jan. 17, 1939 |
| 2,244,987 | Faulkner | June 10, 1941 |
| 2,364,043 | Ariens | Dec. 5, 1944 |
| 2,388,553 | Kraus | Nov. 6, 1945 |
| 2,438,189 | Seaman | Mar. 23, 1948 |
| 2,450,749 | Clark | Oct. 5, 1948 |

FOREIGN PATENTS

| Number | Country | Date |
|---|---|---|
| 512,817 | France | Oct. 23, 1920 |
| 420,542 | Great Britain | Dec. 4, 1934 |